United States Patent Office 3,121,815
Patented Feb. 18, 1964

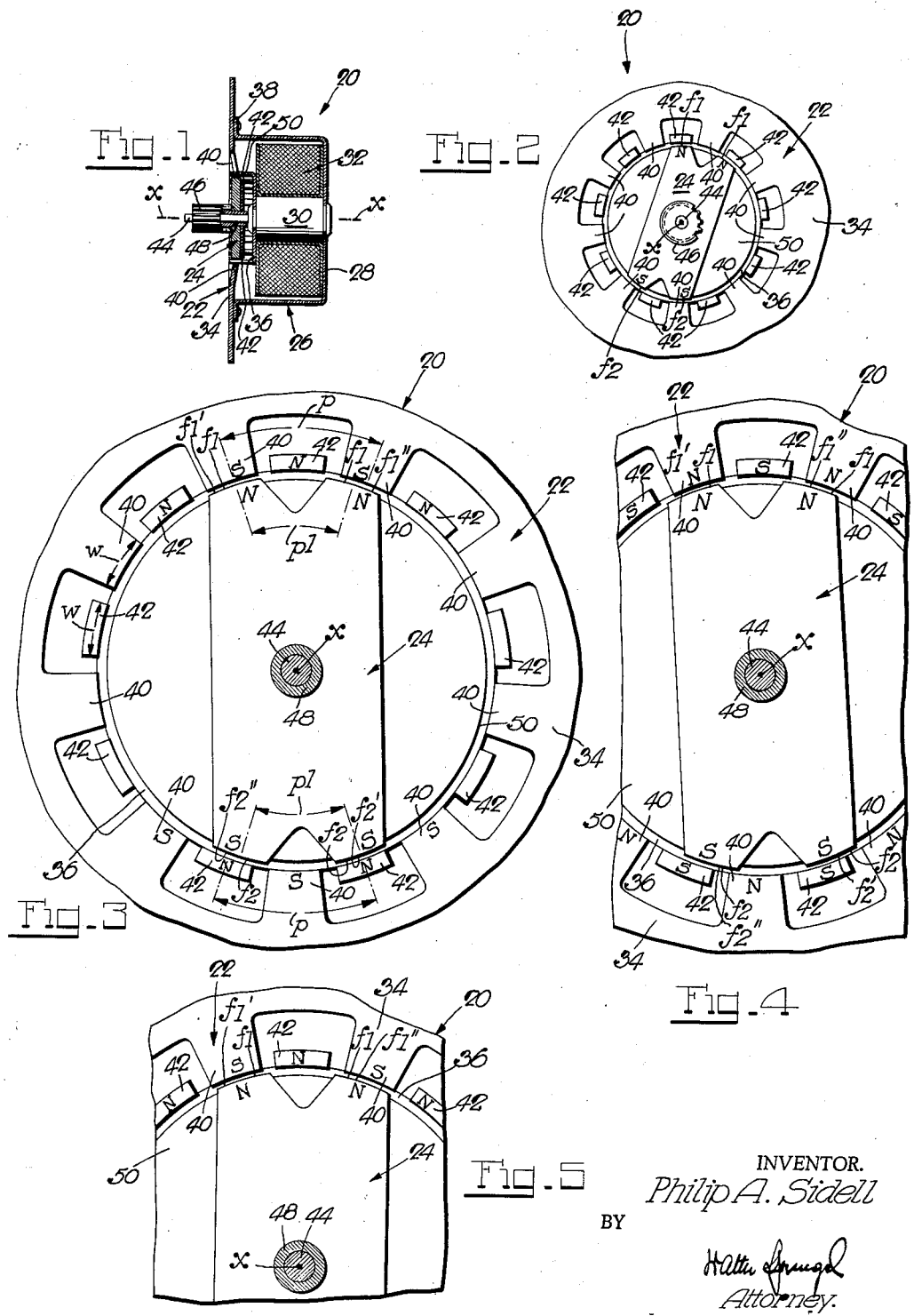

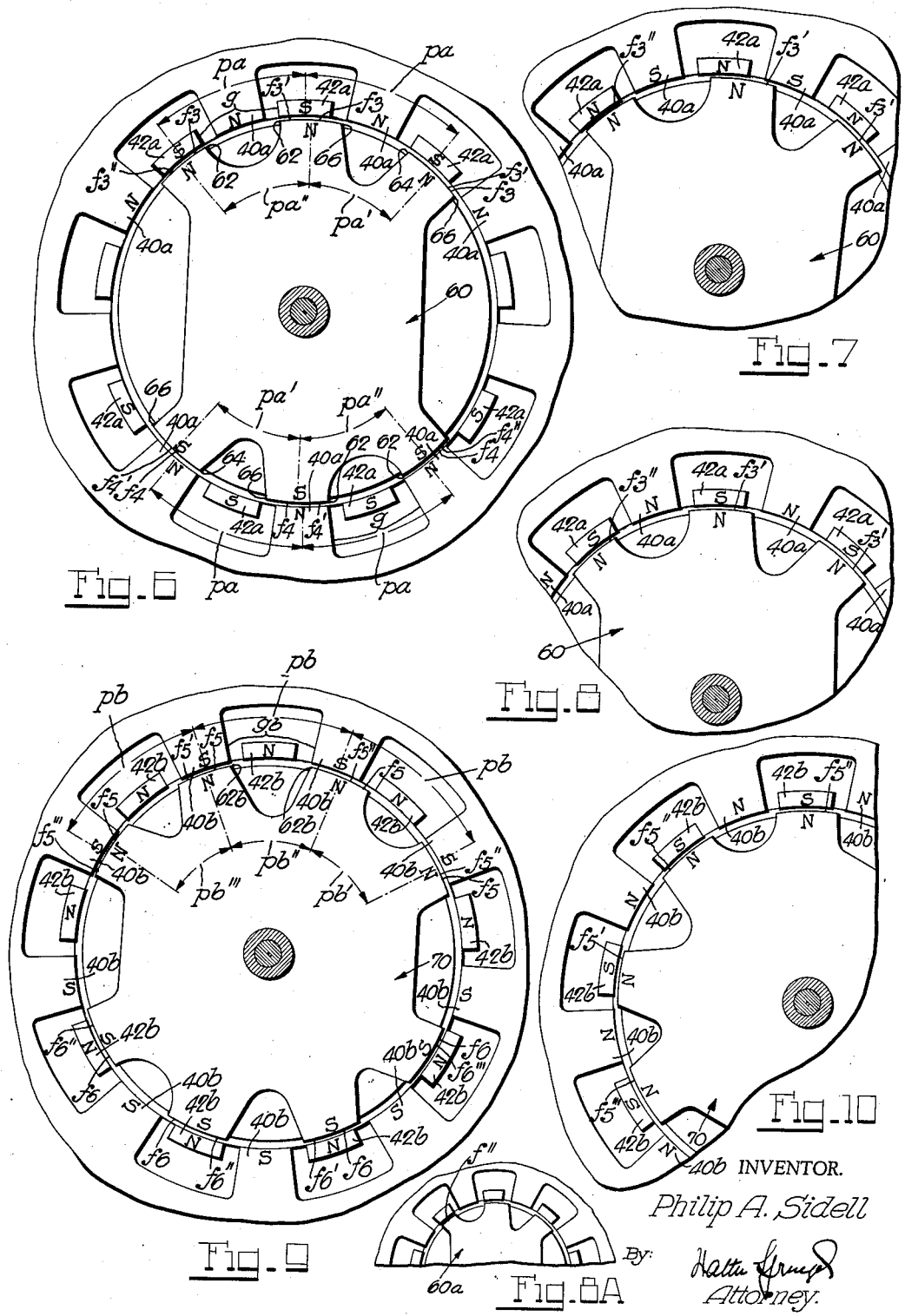

3,121,815
SELF-STARTING SYNCHRONOUS MOTOR OF
HIGH TORQUE OUTPUT
Philip A. Sidell, West Hartford, Conn., assignor to The
Ingraham Company, Bristol, Conn., a corporation of
Connecticut
Filed July 22, 1960, Ser. No. 44,600
16 Claims. (Cl. 310—164)

This invention relates to synchronous reaction motors in general, and to rotors of self-starting type therefor in particular.

The motor with which the present invention is concerned is of the well known kind having a multi-polar field of which alternate poles are of opposite sign or polarity at any given instant and change their polarities in phase with an alternating current supplied to an associated field coil, and a permanent-magnet rotor the poles of which cooperate with the field poles in driving the rotor in synchronism with the alternation of the current. To render this kind of motor self-starting, the poles of prior rotors of one type have been arranged in various different ways to the same end of compelling these rotors to assume repose or idle positions of minimum reluctance in which they are spaced from any of their momentary running positions of minimum reluctance so as to be subjected to unbalancing forces of sufficient magnitude for their quick self-start on excitation of their fields. However, the self-starting characteristics of the prior rotors of this type are obtained by invariably spacing the rotors in their repose positions so far from their momentary running positions that a goodly proportion of their potential running torques is sacrificed, which is a distinct disadvantage in view of ever increasing demands for motors of higher torque output and lower cost at no increase of their size.

It is the primary aim and object of the present invention to provide a self-starting rotor of this type that has a running torque which is only inappreciably less than its potential running torque, and which is in any event higher than the running torques of prior rotors of this type.

It is another object of the present invention to design a self-starting rotor of this type primarily with a view toward obtaining high running torque, and to lend it self-starting characteristics by far less deviation than heretofore of its pole faces from a pole face arrangement which would produce potential maximum running torque if the rotor were not required to self-start.

It is a further object of the present invention to design a self-starting rotor of this type deliberately so that its normal repose positions are in close proximity to its momentary running positions of minimum reluctance. While this is a radical departure from all previous concepts and experiences to locate rotors in their normal repose positions far away from their momentary running positions of minimum reluctance because the latter rotor positions are known to be the conceivably worst positions for self-starting, the contemplated close proximity of these repose and running positions of the present rotor takes into consideration, and permits coordination of the pole faces of the rotor with respect to the field poles for obtaining high running torque as the primary objective.

Another object of the present invention is to provide a self-starting rotor of this type the pole faces of which are arranged in their coordination with the field poles so as to be forced under high magnetic coercion into and beyond their momentary running positions of minimum reluctance without encountering appreciable magnetic resistance at any time, with the pitch relation of the pole faces deviating from that of the field poles at a bare minimum required to cause sufficient unrest of the rotor in any repose position whatsoever for its quick self-start on excitation of the associated field.

A further object of the present invention is to provide a self-starting rotor of this type with the pitch relation of its pole faces having the aforementioned least deviation from that of the field poles, of which the pole faces are further of optimum permissible peripheral widths to confront in any momentary rotor running position of minimum reluctance a maximum of field pole area, but not more than one field pole per pole face, without extending within really effective reach of the nearest field poles of momentarily bucking polarities. With this arrangement of the rotor pole faces, the rotor is self-starting, and its running torque is nevertheless near its potential optimum running torque since torque of inappreciable magnitude at the most is sacrificed as the cost of its self-starting characteristics.

It is another object of the present invention to provide a self-starting rotor of this type the pole faces of which have the aforementioned optimum permissible peripheral widths for high running torque characteristics of the rotor, and the rotor pole faces are also of different widths so as to compel the rotor into quite lively unrest and, hence, determined self-start on excitation of the associated field even at the aforementioned minimum deviation of the pitch relation of the rotor pole faces from that of the field poles.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a section through a motor embodying the present invention;

FIG. 2 is an enlarged, fragmentary front view of the motor of FIG. 1;

FIG. 3 is a further enlarged, fragmentary view of the field poles and the featured rotor of the same motor;

FIGS. 4 and 5 are fragmentary views similar to FIG. 3, but showing the rotor in different operating positions;

FIG. 6 is an enlarged, fragmentary view of a motor with the featured rotor thereof embodying the present invention in a modified manner;

FIGS. 7 and 8 are fragmentary views similar to FIG. 6, but showing the modified rotor in different operating positions;

FIG. 8A is a fragmentary view of a motor with the featured rotor thereof embodying the present invention in another modified manner;

FIG. 9 is an enlarged, fragmentary view of a motor with the featured rotor thereof embodying the present invention in a further modified manner; and FIG. 10 is a fragmentary view similar to FIG. 9, but showing the further modified rotor in a different operating position.

Referring to the drawings, and more particularly to FIGS. 1 and 2 thereof, the reference numeral 20 designates a synchronous motor having a field 22 and a rotor 24. The field 22 presently comprises a housing 26 of general cup shape to the bottom 28 of which is secured a center core 30, a field coil 32 in the housing 26 and surrounding the core 30, and outer and inner field plates 34 and 36 which are suitably secured to a top flange 38 of the housing 26 and to the outer end of the center core 30, respectively. The outer and inner field plates 34 and 36 are provided with sets of inner and outer field poles 40 and 42, respectively, which are circularly arranged about a rotor axis x and of which successive poles of one set alternate with successive poles of the other set in conventional manner.

Extending from the center core 30 is a rotor shaft 44 on which is journalled a pinion 46 to the reduced shank 48 of which is suitably attached, as by a snug fit, the rotor 24 and also a conventional flywheel 50. The pinion 46 may directly drive a load or may be part of a first stage of any desired reduction gearing (not shown). The rotor 24 is a permanent magnet provided with series of pole faces $f1$ and $f2$ of opposite polarities, respectively (FIG. 2) of which the pole faces of each series presently number two. The rotor 24 is self-starting as will be fully explained hereinafter.

In operation of the motor, alternating current is supplied to the field coil 32 to produce in the field poles 40 and 42 opposite instantaneous polarities which change in phase with the alternating current, with the rotor pole faces $f1$ and $f2$ cooperating with the field poles in driving the rotor in synchronism with the alternation of the current in a manner which is conventional with motors of this type.

Reference is now had to FIGS. 3 to 5 which show the field poles 40, 42 and also the rotor 24 at an enlarged scale. The arrangement of the field poles 40 and 42 may be entirely conventional. As already mentioned, the field poles 40 and 42 of the respective sets are arranged circularly about the rotor axis $x$, with successive poles of either set alternating with successive poles of the other set. Further, the pitch $p$ between successive field poles of either set is preferably the same throughout, and all successive field poles are presently also spaced from each other at the same pitch equal to one-half of the pitch $p$. Also, all field poles are preferably of the same peripheral widths $w$.

In accordance with the present invention, the rotor 24 is designed for assured self-starting as well as for optimum running torque. To this end, the series of pole faces $f1$ and $f2$ of the rotor are arranged, first of all, so that each pole face of each series confronts one field pole only of a respective set in any repose position or in any momentary running position of minimum reluctance of the rotor. Thus, FIG. 3 shows the motor in idle condition, with the rotor 24 assuming one of its normal repose positions in which each of the exemplary N pole faces $f1$ of one series confronts only one inner field pole 40 and each of the exemplary S pole faces $f2$ of the other series confronts only one outer field pole 42. The rotor 24 is fixed in any of its normal repose positions and locked therein with a relatively weak magnetic force, and this is accomplished by making at least one of the pole faces of a series, and presently one of each series, of the same peripheral width as the field poles, while the remaining pole faces are arranged so as not to oppose full alignment of the other pole faces with confronting field poles. In the present rotor 24, the diametrically opposite pole faces $f1'$ and $f2'$ are of the same widths as the field poles and fully align with their respective confronting field poles 40 and 42 to fix the exemplary normal rotor repose position (FIG. 3) and magnetically lock the rotor therein, while each of the remaining pole faces $f1$ and $f2$ confronts only part of one field pole and, hence, in no wise opposes full alignment of the pole faces $f1'$ and $f2'$ with their confronting field poles.

To render the present rotor 24 self-starting, the pole faces of at least one series, and preferably the pole faces of each series, are unbalanced with respect to their confronting field poles, meaning that one pole face of each series is out of alignment with its confronting field pole when the other pole face thereof is in alignment with its confronting field pole. To this end, the pitch $p1$ between the pole faces of each series is different, presently smaller, than the pitch $p$ between their confronting field poles. The pole faces $f1''$ and $f2''$ are preferable also of larger peripheral widths than the field poles so as to place them in each rotor repose position within effective magnetic reach of adjacent successive field poles which on initial successive polarizations in the reenergized field cooperate with the rotor pole faces in exerting relatively powerful unbalancing forces on the rotor and quickly start the same into full rotation. Most motors of this type are provided with well-known directional drive controls which reverse the rotor if the same should self-start in a direction opposite to its normal drive direction, but such a directional drive control is omitted for the sake of simplicity and also because it forms no part of the present invention.

For a better understanding of the magnetic actions of the rotor pole faces and field poles for a self-start of the rotor, let it be assumed that the field coil 32 (FIG. 1) is reenergized and that the initial polarities of the field poles 40 and 42 are as indicated in FIG. 3. In consequence, the N pole face $f1''$ is repelled from the nearest N field pole 42 and attracted to the nearest S field pole 40, while the S pole face $f2''$ is repelled from the nearest S field pole 40 and attracted to the nearest N field pole 42, these repelling and attracting forces on the rotor all acting in concert and tending to set the latter in presently clockwise motion without appreciable resistance from the pole faces $f1'$ and $f2'$ and their respective fully aligned field poles 40 and 42. However, the rotor will usually not self-start on the very first polarization of the field poles due to inertia of the rotor and its flywheel and frequently also load, and the rotor will, instead, have characteristic quivers on subsequent polarizations of the field poles before it actually takes off in either direction. Thus, the rotor 24 will on the initial polarization of the field poles hardly budge from its exemplary repose position (FIG. 3). However, the rotor will on subsequent polarizations of the field poles become quite restless, as in FIG. 4, for example, where the rotor responds to the indicated momentary polarities of the field poles in counterclockwise direction, and may well take off in clockwise direction on the next polarization of the field poles.

Once the rotor has self-started, the same will have momentary running positions of minimum reluctance like, or very similar to, that shown in FIG. 5, from which it appears that the described unbalance and widthwise arrangement of the rotor pole faces with respect to the field pole arrangement has not really any obstructing effect on the forward progress of the rotor. Thus, all pole faces are then in nearly full alignment with their confronting field poles, wherefore they are then not only sufficiently spaced from the nearest field poles of presently momentary bucking or braking polarities to be really affected thereby, but they are also beyond effective brake reach of their confronting field poles on the polarity reversal of the latter at the very next instant.

It follows from the preceding that the described arrangement of the pole faces of the rotor, and particularly their unbalance and widths with respect to the field poles not only assures quick and energetic self-start of the rotor but also high running torque. Of course, the particular arrangement of the rotor pole faces to attain the dual objective of self-start and high running torque of the rotor is predicated on the deliberate location of the rotor repose positions (FIG. 3) in very close proximity to any of the rotor running positions of minimum reluctance (FIG. 5). At the outset, it certainly would appear that these rotor repose positions are particularly unfavorable in view of their very close proximity to the momentary rotor running positions of minimum reluctance which are known to be the conceivably worst positions from which to self-start a rotor. Yet, the foregoing description of a self-start of the rotor from the exemplary normal repose position in FIG. 3 belies any apparent difficulty of the rotor to self-start from any of its repose positions despite their close proximity to the rotor running positions of minimum reluctance. On the other hand, the amount of unbalance of the rotor pole faces of each series required to place the rotor in any of its normal repose positions in very close proximity to any of its momentary running positions of minimum reluctance permits widthwise arrangement of these pole faces so that they align nearly fully with their confronting field poles and are out of effective reach of the nearest field poles of momentarily braking polarities in any momentary rotor running position of minimum reluctance (FIG. 5), with ensuing near optimum running torque of the rotor as well as the least hunting or surging of the rotor in its rotary progress.

The featured deliberate location of the rotor in its repose positions in very close proximity to its momentary running positions of minimum reluctance has the further advantage of affording even maximum assurance that the rotor will self-start. Thus, should the rotor, by virtue of increased frictional resistance due to dirt or failing lubrication, for example, come to rest in any abnormal position other than one coincident, or nearly coincident, with any of its momentary running positions of minimum reluctance (FIG. 5), the rotor will on reenergization of the field almost invariably be subjected to unbalancing forces of even greater magnitude than in any of its normal repose positions, as will be readily understood. Yet, since the pole faces of each series are in any momentary rotor running position of minimum reluctance (FIG. 5) unbalanced with respect to their confronting field poles, slightly to be sure but unbalanced nevertheless, the condition for a self-start of the rotor in any abnormal repose position coincident, or nearly coincident, with any of its momentary running positions of minimum reluctance is met and the rotor will self-start even then.

While the described rotor 24 with its exemplary two series of two pole faces each will assuredly self-start and has near optimum running torque for a four-pole face rotor, a rotor with more than four overall pole faces and embodying the present invention is indicated where greater motor loads require even higher operating torque. Such a rotor is shown in FIG. 6 and designated by the reference numeral 60. The associated field poles 40a and 42a are arranged the same as the field poles 40 and 42 of FIG. 3. The permanent-magnet rotor 60 is provided with two series of three pole faces f3 and f4 each, of which both series of pole faces are presently identical and are also equi-angularly spaced for preferred dynamic balance of the rotor. FIG. 6 shows the rotor 60 in one of its planned repose positions in any of which it is in very close proximity to any of its momentary running positions of minimum reluctance (FIG. 8), and it appears also from FIGS. 6 and 8 that each pole face confronts one field pole only in any of the rotor repose and momentary running positions of minimum reluctance in accordance with the present invention. To the end of obtaining unbalance of the rotor pole faces of at least one series with respect to their confronting field poles for self-starting characteristics of the rotor, as further required in accordance with the present invention, the overall pitch relation between the pole faces, presently of each series, is different from the overall pitch relation of their confronting field poles. In this connection, the presently identical pole faces f3' and f4' have a pitch pa' which is identical with the uniform pitch pa between successive field poles of each set, while the pitch pa" between the remaining pole faces f3", f4" and their nearest respective pole faces f3' and f4' is different from and presently larger than, pitch pa of either field pole set. Also, all rotor pole faces are presently of larger peripheral widths than the field poles and the identical pole faces f3' and f4' are of different peripheral widths, presently larger, than the other pole faces f3" and f4", to add to the unbalance of the pole faces of each series.

Since all pole faces are of greater widths than their confronting field poles, the rotor could seek repose positions other than the presently planned ones (FIG. 6) were it not for the following expediency in accordance with another aspect of the present invention. Thus, the adjacent ends 62 of the successive pole faces f3', f3" and f4', f4", which are leading ends in opposite directions of rotor rotation, are spaced apart on angular distance equal to the gap g between successive poles of each series, so that these adjacent pole face ends 62 will align with the adjacent ends of a pole gap g between them when the rotor comes to rest on deenergization of the field. The rotor repose positions (FIG. 6) are thus fixed and the rotor magnetically locked therein. In the present rotor, the ends 62 of the pole faces f3" and f4" have also the same general relation with the adjacent ends 64 of the endmost pole faces f3' and f4', respectively, i.e., these adjacent pole face ends are leading ends in opposite directions of rotor rotation and they are spaced apart an angular distance equal to the overall gap between their confronting field poles. In thus coordinating the pole face ends 62 and 64, the rotor repose positions are fixed most positively (FIG. 6) and, more importantly, optimum unbalance of the pole faces of the rotor for its quick and lively self-starting from any of its repose positions is achieved as will be explained presently.

Since the identical rotor pole faces f3' and f4' are of greater peripheral widths than the field poles and their ends 62 and 64 align with the adjacent ends of their confronting field poles in any rotor repose position (FIG. 6), these pole faces f3' and f4' extend with their opposite ends 66 unidirectionally beyond the adjacent ends of their confronting field poles and into close proximity to, though preferably somewhat spaced from, their next nearest field poles. Hence, assuming that the permanent polarities of the rotor pole faces, and the exemplary initial polarities of the field poles on reenergization of the field, are as indicated in FIG. 6, it stands to reason that the field poles of opposite polarities confronting and next nearest to the pole faces f3' and f4' subject the rotor to rather powerful repelling and attractive forces which act in concert and tend to set the rotor in presently counterclockwise motion. While the rotor will usually not respond in actual motion to this exemplary initial polarization of the field poles due to its inertia, the initial polarization of the field poles will set up the rotor for its characteristic transient phase of lively quivers on subsequent polarizations of the field poles before the same will take off. Thus, the rotor 60 is shown in FIG. 7 in an intermediate stage of its very brief quiver phase, with the rotor possibly taking off in counterclockwise direction on the next polarization of the field poles. The end pole faces f3" and f4", being narrower than the other rotor pole faces and extending less beyond their confronting field poles in one direction of rotor rotation than the other pole faces extend beyond their confronting field poles in the opposite direction of rotor rotation in any rotor repose position (FIG. 6), will not effectively oppose the described exemplary self-start of the rotor and will even assist its self-start (FIG. 7).

Having once self-started, the rotor will step in phase with the alternation of the current, passing through momentary running positions of minimum reluctance like or very similar to that shown in FIG. 8. The running torque of the rotor is evidently quite high, owing to the fact that in each of its momentary running positions of minimum reluctance all pole faces are in near alignment with and substantially fully confront their opposite field poles, and all pole faces are out of effective reach of the nearest field poles of momentarily braking polarities. This holds true despite the near optimum one-sided unbalance of the pole faces f3' and f4' relative to their confronting field poles in any of the rotor repose positions (FIG. 6) which is so advantageous for a self-start of the rotor, for the tendency of the pole faces f3' and f4' of one-sided unbalance to align with their confronting field poles in any momentary running position of minimum reluctance is not sufficiently opposed by the pole faces f3" and f4" of opposite unbalance to prevent the substantial back-up of the rotor from rest (FIG. 6) into the momentary positions of minimum reluctance during running (FIG. 8).

The present rotor 60 has not only all the advantages of the earlier described rotor 24 (FIG. 3), but has also additional advantages. Thus, with comparatively little additional material the present rotor has incomparably higher starting and running torque, more positively defined repose positions and yet far greater instability for its assured self-start in the reenergized field, than the rotor 24, and this without increasing the field. The present rotor is also characteristic for optimum unbalance and optimum peripheral widths of its pole faces within the relatively severe limits imposed on their arrangement by the requirement that each pole face of each series confronts one field pole only in each of the repose and momentary running positions of minimum reluctance of the rotor and that the latter must have near optimum torque for a six-pole face rotor and nevertheless self-start without fail, all in accordance with the present invention. In this connection, the like one-sided near-optimum unbalance of the pole faces $f3'$ and $f4'$ and the like opposite-sided smaller unbalance of the pole faces $f3''$ and $f4''$ with respect to their confronting field poles in any rotor repose position as well as the greater peripheral widths of the pole faces in comparison to those of the field poles, go far toward achieving these ends. The particular arrangement of the rotor pole faces to attain the ends of self-start and high running torque of the rotor is, of course, permitted by the deliberate location of the rotor in any of its repose positions (FIG. 6) in very close proximity to any of its momentary running positions of minimum reluctance (FIG. 8) in accordance with the present invention. Substantial maximum pole face areas are thus put to advantageous use in the matter of achieving both, high running torque and assured self-start of the rotor. Of course, and as in the case of the previously described rotor 24, the present rotor will self-start even more energetically from any abnormal repose position than from any of its normal repose positions (FIG. 6), except from an abnormal repose position which is coincident, or nearly coincident, with any of its momentary running positions of minimum reluctance. Yet, looking at the exemplary momentary running position of minimum reluctance of the rotor in FIG. 8, it appears that if the rotor would accidentally come to rest in this position its pole faces would even then be sufficiently unbalanced with respect to their confronting field poles to bring about self-start of the rotor on reenergization of the field.

While the present rotor could have starting and running characteristics similar to those described if only one series of pole faces were arranged as shown and the pole faces of the other series were arranged differently, for example for high running torque and without any consideration for a self-start of the rotor, it is distinctly advantageous to arrange the pole faces of all series identically and in equi-angularly spaced relation around the rotor not only for best self-starting characteristics and high running torque as well as for optimum smooth running characteristics of the rotor, but also for dynamic balance of the rotor.

Reference is now had to FIG. 8A which shows a rotor 60a that may in all respects be like the rotor 60 of FIG. 6, except that the pole face $f''$, and preferably also its diametrically opposite pole face (not shown), are of the same peripheral widths as and fully align with their respective confronting field poles in any rotor repose position. The present rotor 60a generally performs like the rotor 60, though not quite as efficiently as the latter due to somewhat reduced overall pole face area and also somewhat less overall unbalance of the pole faces with respect to their confronting field poles. Nevertheless, the rotor 60a is shown to indicate that not all pole faces of a series of more than two pole faces need be of greater widths than the field poles in order to obtain satisfactory rotor characteristics in point of self-start and running torque according to the present invention.

Reference is now had to FIG. 9, which shows still another permanent-magnet rotor 70 having two identical series of four pole faces each and of opposite polarities, respectively, of which the pole faces $f5$ of one series are arranged the same as the pole faces $f6$ of the other series around the rotor and both series of pole faces are equi-angularly spaced for dynamic balance of the rotor. Hence, a detailed description of the arrangement of the pole faces of but one series, presently the pole faces $f5$, will suffice for an understanding of the arrangement of the pole faces of both series. Three successive ones of the pole faces $f5$, namely $f5'$ and $f5''$, are presently arranged the same as the pole faces of either set of the rotor 60 of FIG. 6. Thus, the pole faces $f5'$ and $f5''$ are of larger peripheral widths than the field poles $40b$ and $42b$, and the pole faces $f5''$ are of identical widths larger than that of the pole face $f5'$, with the pitch $pb'$ between the pole faces $f5''$ being equal to the pitch $pb$ between successive poles $40b$ or $42b$, while the pitch $pb''$ between the pole face $f5'$ and the nearest pole face $f5''$ is somewhat larger than the pitch $pb$ of the field poles of either set. The adjacent ends $62b$ of the successive pole faces $f5'$ and $f5''$ are spaced apart an angular distance equal to the gap $gb$ between successive field poles of either set, so that these pole face ends $62b$ align with the adjacent ends of a field pole gap $gb$ between them after the field is deenergized and the rotor comes to rest, thereby fixing the rotor in any of its repose positions and magnetically locking the rotor therein (FIG. 9). The pole face $f5''$ next to the pole face $f5'$ thus extends in each rotor repose position along the entire width of its confronting field pole and also therebeyond, presently in clockwise direction, into fairly close proximity to the next nearest field pole, and the endmost pole face $f5''$ has exactly the same relation with its confronting field pole and the clockwise next nearest field pole. While the pole faces $f5''$ of largest widths thus have near-optimum unbalance in presently clockwise direction with respect to their confronting field poles, the pole face $f5'$ of smaller width has less unbalance in the opposite, counterclockwise, direction with respect to its confronting field pole, in any of the rotor repose positions. Accordingly, if the present rotor 70 had only the three pole faces $f5'$ and $f5''$ in the one series and the corresponding pole faces $f6'$ and $f6''$ in the opposite series, the rotor would perform in every respect like the previously described rotor 60 of FIGS. 6 and 8.

The fourth pole faces $f5'''$ and $f6'''$ in the respective series, presently arranged as end pole faces next to the respective narrower pole faces $f5'$ and $f6'$, are of the same large widths as the pole faces $f5''$ and $f6''$ and have exactly the same relation with the adjacent field poles as the latter pole faces have with their adjacent field poles in any rotor repose position (FIG. 9). Accordingly, a majority, presently three, of the pole faces of each series are unbalanced in one rotor direction equally and at near optimum with respect to their confronting field poles, and a minority, presently one, of the pole faces of each series of smaller widths are unbalanced to a less extent in the opposite rotor direction with respect to their confronting field poles, in any of the rotor repose positions. To this end, the pitch $pb'''$ between the pole faces $f5'$ and $f5'''$ of the one series, which is the same as the pitch between the pole faces $f6'$ and $f6'''$ of the opposite series, is smaller than the pitch $pb$ of either field pole set by the same amount that the pitch $pb''$ between the successive pole faces $f5'$ and $f5''$ is larger than the pitch $pb$, meaning that the pitch between the pole face $f5'''$ and the nearest pole face $f5''$ of the one series, and also between the pole face $f6'''$ and the nearest pole face $f6''$ of the other series, is equal to the overall pitch between three successive field poles of either set.

Assuming that the permanent polarities of the pole faces of the rotor, and the initial polarities of the field poles on reenergization of the field, are as indicated in FIG. 9, it will be readily understood that the identical pole faces $f5''$ and $f5'''$ of one series and their counterparts $f6''$ and $f6'''$ of the other series are subjected to powerful repellent and attractive forces which act in concert and tend to set the rotor in presently counterclockwise motion, with the narrower pole faces $f5'$ and $f6'$ offering no effective opposition due to their near alignment with their confronting field poles and substantial spacing from their next nearest field poles. As usual, the rotor will not take off on initial polarization of the field poles in the reenergized field and, instead, will pass through a transient phase of lively quivers on succeeding polarizations of the field poles before taking off in either direction. However, due to the near optimum overall unbalance in only one effective rotor direction of the rotor pole faces with respect to their confronting field poles in any rotor repose position, the magnetic forces acting on the rotor on reenergization of the field have an overall force of exceptionally large magnitude peripherally of the rotor in the same direction at any instant, wherefore the starting torque of the rotor rises almost immediately to a correspondingly high magnitude which in any event is fully adequate to start the rotor quickly and most energetically even with an exceptionally heavy load.

While the starting torque of the present rotor 70 is of exceptionally high magnitude, this does in no wise detract from an exceptionally high magnitude of its running torque. Thus, the rotor assumes in any of its momentary running positions of minimum reluctance a position like or very similar to that shown in FIG. 10, in which the majority of the pole faces of largest widths of each series are in near alignment with their confronting field poles and are out of effective reach of the next nearest field poles of momentarily braking polarities, with the minority of the pole faces of smaller widths, presently the pole faces $f5'$ and $f6'$, being also in sufficient near alignment with their confronting field poles and sufficiently spaced from the other nearest field poles not to hinder the progress of the rotor.

As in the case of the previously described rotors, the present rotor 70 has the attributes of assured self-start and starting and running torques of exceptionally high magnitudes due to the arrangement of the pole faces, in accordance with the present invention, so that they have overall optimum widths and also overall optimum unbalance, unidirectionally, with respect to the field poles, within the limits imposed by the requirement that they confront one field pole only in any rotor repose or momentary running position of minimum reluctance. To achieve this end, the rotor repose positions are again selected and fixed (FIG. 9) to be in very close proximity to the momentary rotor running positions of minimum reluctance (FIG. 10) in accordance with the present invention. This close proximity of the rotor repose and running positions of minimum reluctance will also assure self-start of the rotor from any abnormal repose positions, and the rotor will self-start even more vigorously from most abnormal repose positions except those coincident, or nearly coincident, with its momentary running positions of minimum reluctance. Yet, even if the rotor should come to rest in the most unfavorable abnormal repose position for a self-start, i.e., in a position coincident with any of its momentary running positions of minimum reluctance (FIG. 10), the pole faces of the rotor will even then be sufficiently unbalanced, preponderantly, unidirectionally, with respect to their confronting field poles that the rotor will self-start on reenergization of the field.

While all of the described rotors have two series of pole faces, it is, of course, fully within the purview of the present invention to provide a rotor having more than two series of pole faces. Also, while the pole faces of each series of all described rotors are successive pole faces of the rotor, successive pole faces of one series may alternate with successive pole faces of another series or the pole faces of all series may be staggered around the rotor in any other desired manner, with all series of pole faces being preferably equi-angularly spaced from each other to maintain dynamic balance of the rotor.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous motor, the combination with a field having two sets of field poles arranged circularly about an axis of which successive poles of one set alternate with successive poles of the other set; an associated field coil adapted on energization to produce opposite instantaneous polarities in said pole sets, of a permanent-magnet rotor turnable about said axis and having series of pole faces of opposite polarities, respectively, so arranged that on energization and deenergization of said coil said rotor will have running and repose positions of minimum reluctance, respectively, in any of which each pole face of each series confronts one field pole only of a respective set, with none of said pole faces being of smaller peripheral widths than said field poles and the overall pitch relation of said pole faces being different from the overall pitch relation of their confronting field poles to produce in said rotor in any position thereof adequate torque for its self-start on energization of said coil.

2. The combination in a synchronous motor as set forth in claim 1, in which each pole face of each series confronts one field pole only of a respective set and is angularly spaced from the nearest field poles of the other set in any of said rotor running and repose positions.

3. The combination in a synchronous motor as set forth in claim 2, in which said pole faces are of such peripheral widths that each confronts the full peripheral width of one field pole only in any of said rotor repose positions.

4. In a synchronous motor, the combination with a field having two sets of field poles arranged circularly about an axis at substantially uniform pitch of which successive poles of one set alternate with successive poles of the other set, and an associated field coil adapted on energization to produce opposite instantaneous polarities in said pole sets, of a permanent-magnet rotor turnable about said axis and having series of pole faces of opposite polarities, respectively, with the pole faces of each series numbering more than two, said pole faces being so arranged that on energization and deenergization of said coil said rotor will have running and repose positions of minimum reluctance, respectively, in any of which each pole face of each series confronts one field pole only of a respective set, with none of said pole faces being of smaller peripheral widths than said field poles and the overall pitch relation of the pole faces of each series being different from the overall pitch relation of their confronting field poles to produce in said rotor in any position thereof adequate torque for its self-start on energization of said coil.

5. The combination in a synchronous motor as set forth in claim 4, in which said field poles are of substantially uniform peripheral widths, and at least part of said rotor pole faces are of larger peripheral widths than said field poles so that each pole face confronts the full width of one field pole only in any of said rotor repose positions.

6. The combination in a synchronous motor as set forth in claim 4, in which said field poles are of substantially uniform peripheral widths, and said pole faces of each series are of such peripheral widths that each confronts the full width of one field pole only of a respective set in any of said rotor repose positions and is angularly spaced from the nearest field poles of the other set in any of said rotor positions.

7. The combination in a synchronous motor as set forth in claim 4, in which said field poles are of substantially uniform peripheral widths, and those ends of at least two rotor pole faces which lead in opposite directions of rotor rotation are spaced the same as, and on deenergization of said coil align with, the adjacent ends of field poles confronting said two pole faces when the rotor comes to rest, thereby fixing the rotor repose positions and magnetically locking the rotor therein.

8. In a synchronous motor, the combination with a field having two sets of field poles arranged circularly about an axis at substantially uniform pitch of which all poles are of substantially uniform peripheral widths and successive poles of one set alternate with successive poles of the other set, and an associated field coil adapted on energization to produce opposite instantaneous polarities in said pole sets, of a permanent-magnet rotor turnable about said axis and having identical equi-angularly spaced series of pole faces of opposite polarities, respectively, with the pole faces of each series numbering more than two, said pole faces being so arranged that on energization and deenergization of said coil said rotor will have running and repose positions of minimum reluctance, respectively, in any of which each pole face of each series confronts one field pole only of a respective set, none of said pole faces being of smaller peripheral widths than said field poles and the overall pitch relation of the pole faces of each set being different from the overall pitch relation of their confronting field poles to produce in said rotor in any position thereof adequate torque for its self-start on energization of said coil, and those ends of at least two rotor pole faces of each series which lead in opposite directions of rotor rotation are spaced the same as, and on deenergization of said coil align with, the adjacent ends of field poles confronting said two pole faces when the rotor comes to rest, thereby fixing the rotor repose positions and magnetically locking the rotor therein.

9. The combination in a synchronous motor as set forth in claim 8, in which the pitch between one of said two pole faces and the remaining pole faces, and between said remaining pole faces, of each series is different from, respectively equal to, the pitch between their confronting field poles, said remaining pole faces of each series have identical peripheral widths larger than those of said field poles so that their trailing and leading ends in one direction of rotor rotation align with and extend beyond the adjacent ends of their confronting field poles of a set, respectively, in any of said rotor repose positions, and said one pole face of each series is of smaller peripheral width than said remaining pole faces thereof.

10. The combination in a synchronous motor as set forth in claim 9, in which said one pole face of each series is of a peripheral width smaller than that of each of said remaining pole faces thereof but larger than that of a field pole.

11. The combination in a synchronous motor as set forth in claim 10, in which said leading ends of said remaining pole faces of each series are in any of said rotor repose positions angularly spaced from the nearest field poles of the other set.

12. A rotor for a synchronous motor having two sets of field poles circularly arranged at uniform pitch and with successive poles of one set alternating with successive poles of the other set, comprising a permanent magnet with a rotary axis and having series of peripheral pole faces of opposite polarities, respectively, and of more than two pole faces in each series, with said pole faces having peripheral widths and being angularly spaced so that each pole face of each series confronts the full width of one field pole only of a respective set and is angularly spaced from the nearest field poles of the other set in certain rotor positions in which any pole face thereof confronts the full width of any field pole, and the pitch lines of first and second pole faces of each series are in and out of alignment, respectively, with the pitch lines of their confronting field poles in any of said certain rotor positions for self-start of the rotor.

13. A rotor for a synchronous motor having two sets of field poles of uniform peripheral widths circularly arranged at uniform pitch and with successive poles of one set alternating with successive poles of the other set, comprising a permanent magnet with a rotary axis having identical equi-angularly spaced series of peripheral pole faces of opposite polarities, respectively, and of more than two pole faces in each series, with said pole faces having peripheral widths and being angularly spaced so that each pole face of each series confronts the full width of one field pole only of a respective set and is angularly spaced from the nearest field poles of the other set in all respose positions of the rotor, and the pitch lines of first and second pole faces of each series are differently spaced from the pitch lines of their confronting field poles in any of said rotor repose positions, with the rotor repose positions being fixed and the rotor magnetically locked therein by those ends of at least two pole faces of each series which lead in opposite directions of rotor rotation and are spaced the same as, and align with, the adjacent ends of field poles confronting said two pole faces of each series when the rotor comes to rest.

14. A rotor for a synchronous motor as set forth in claim 13, in which said two pole faces of each series are successive pole faces of the rotor.

15. A rotor for a synchronous motor as set forth in claim 13, in which the pitch between one of said two pole faces and the remaining pole faces, and between said remaining pole faces, of each series is different from, respectively equal to, the pitch between their confronting field poles, said remaining pole faces of each series have identical peripheral widths larger than those of said field poles so that their trailing and leading ends in one direction of rotor rotation align with and extend beyond the adjacent ends of their confronting field poles of a set, respectively, in any of said rotor repose positions, and said one pole face of each series is of smaller peripheral width than said remaining pole faces thereof.

16. A rotor for a synchronous motor as set forth in claim 15, in which said one pole face of each series is of a peripheral width smaller than that of each of said remaining pole faces thereof but larger than that of a field pole.

References Cited in the file of this patent

UNITED STATES PATENTS

| | | |
|---|---|---|
| 2,677,776 | Kolhagen | May 4, 1954 |
| 2,691,112 | Clifford et al. | Oct. 5, 1954 |
| 2,793,307 | Gallagher | May 21, 1957 |
| 2,794,137 | Faus et al. | May 28, 1957 |